(12) United States Patent
Lee et al.

(10) Patent No.: US 6,292,622 B1
(45) Date of Patent: Sep. 18, 2001

(54) METHOD OF LOW-SPEED REPRODUCING IN A VIDEO CASSETTE RECORDER

(75) Inventors: Jong-gyu Lee; Gyu-yeong Son, both of Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/020,172

(22) Filed: Feb. 6, 1998

(30) Foreign Application Priority Data

| | | |
|---|---|---|
| Feb. 6, 1997 | (KR) | 97-3882 |
| Feb. 10, 1997 | (KR) | 97-3871 |
| Feb. 10, 1997 | (KR) | 97-3872 |

(51) Int. Cl.[7] ................................................ H04N 5/783
(52) U.S. Cl. ........................ 386/68; 386/72; 386/78; 386/80
(58) Field of Search .......................... 386/6–8, 21, 68, 386/22, 72, 74, 78–81, 113–114; 360/73.01, 73.04, 73.08, 73.09, 73.11, 73.12, 73.14; H04N 5/76, 5/92, 9/79, 5/783

(56) References Cited

U.S. PATENT DOCUMENTS

| | | | |
|---|---|---|---|
| 5,319,499 | * 6/1994 | Kim et al. | 386/72 |
| 5,539,589 | * 7/1996 | Yamamoto | 386/51 |
| 5,684,916 | * 11/1997 | Hong | 386/68 |
| 5,966,265 | * 10/1999 | Takayama | 386/71 |
| 6,014,493 | * 1/2000 | Shimoda | 386/68 |
| 6,078,724 | * 6/2000 | Kawase | 386/71 |
| 6,173,111 | * 1/2001 | Kwon et al. | 386/68 |

* cited by examiner

*Primary Examiner*—Thai Tran
(74) *Attorney, Agent, or Firm*—Dilworth & Barrese, LLP

(57) ABSTRACT

A method for low-speed reproducing in a video cassette recorder (VCR) having a pair of main heads for normal-speed reproducing and at least a pair of additional heads neighboring said main heads is disclosed. A period which is regularly repeated from an envelope waveform of a video signal reproduced by said main heads is detected. The voltage level of the detected envelope waveform is then compared with a voltage level of the envelope waveform detected by the additional heads by generating a pseudo head switching pulse for switching the operation state of said main heads and additional heads according to the detected period. And, a reproduced signal from one of the said main and additional heads which has the envelope waveform having a high voltage level detected, thereby reproducing a high quality continuous time varying image without a noise.

12 Claims, 13 Drawing Sheets

FIG. 4A Head switching pulse
FIG. 4B Control signal
FIG. 4C Envelope waveform

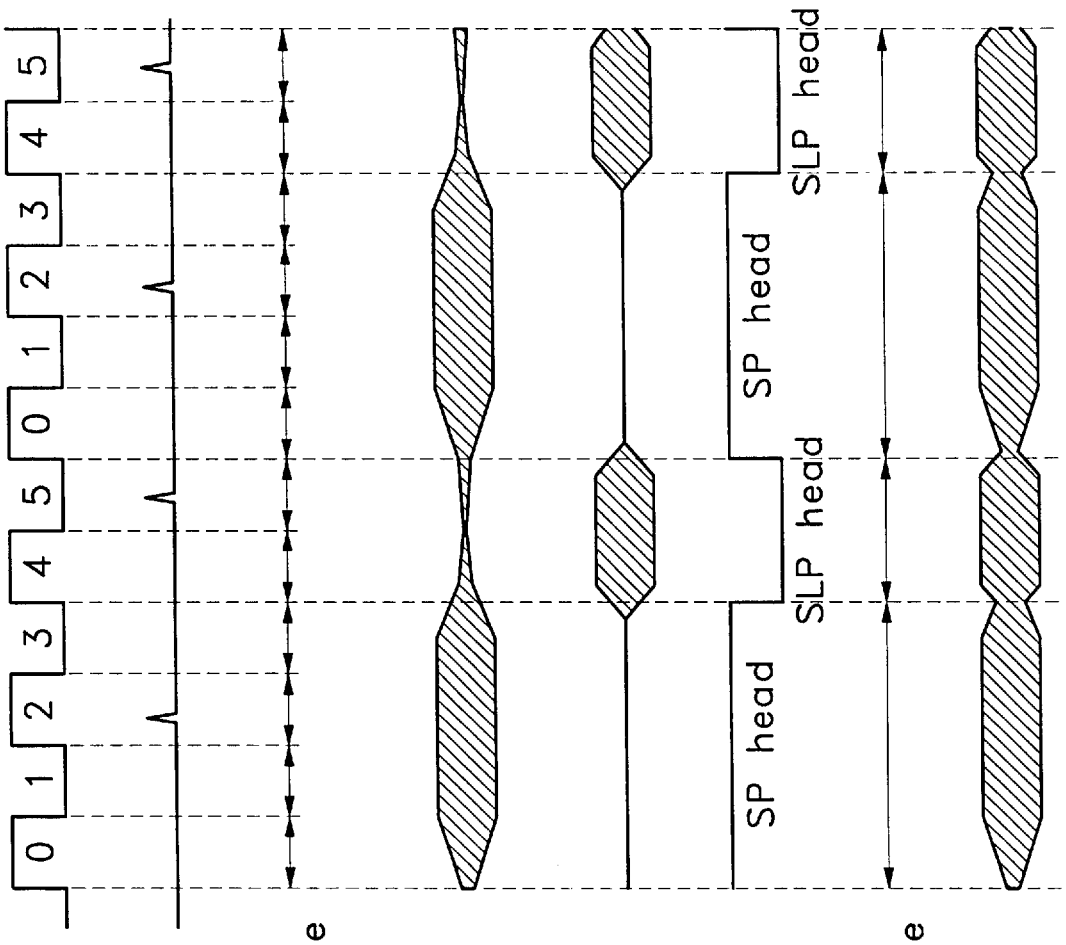

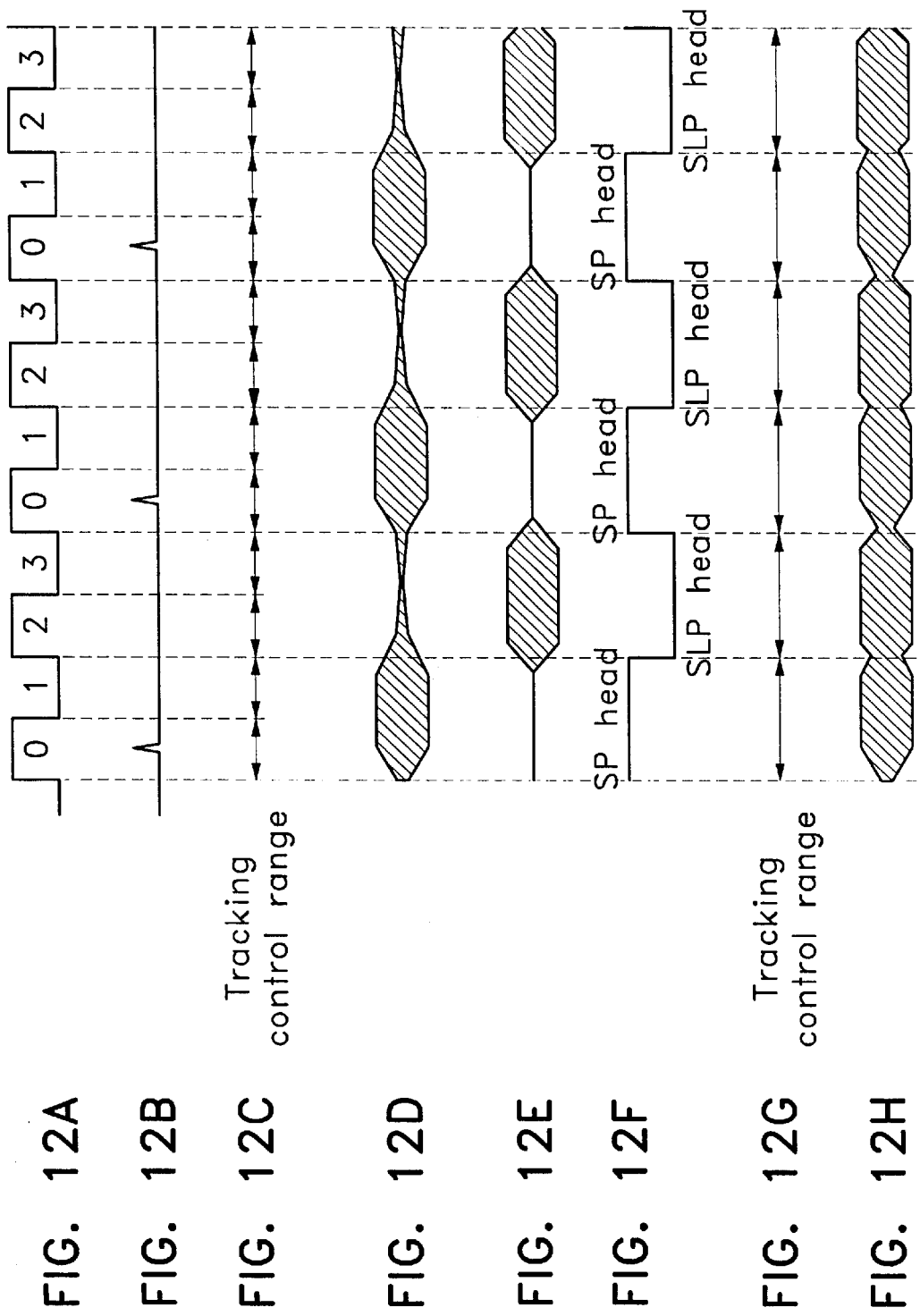

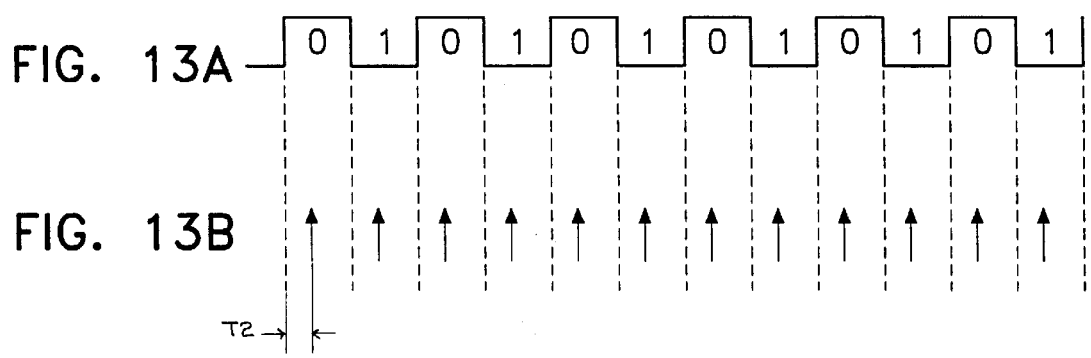
FIG. 13A
FIG. 13B
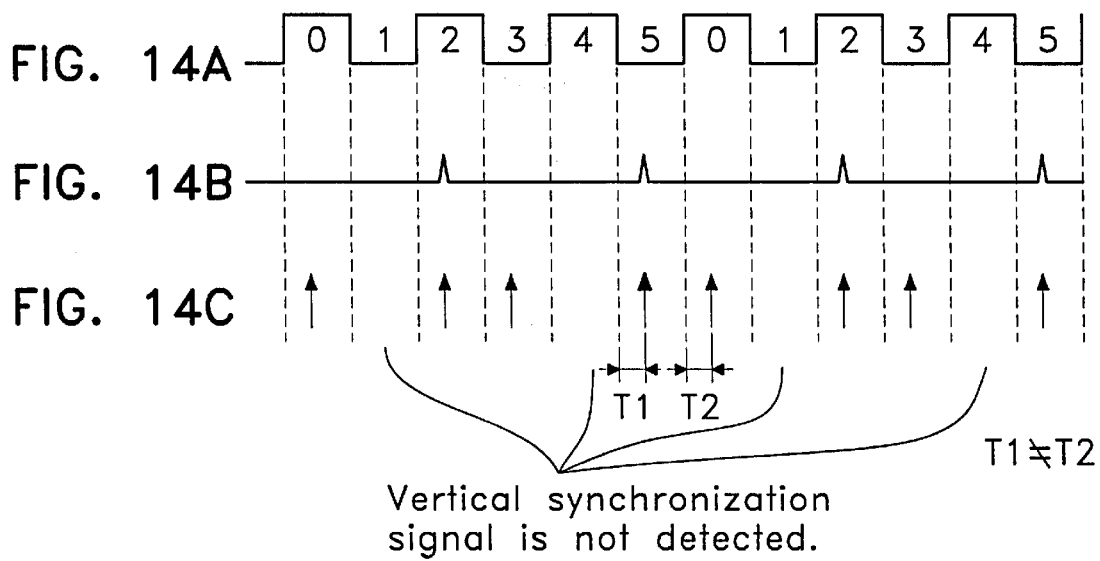
FIG. 14A
FIG. 14B
FIG. 14C
Vertical synchronization signal is not detected.

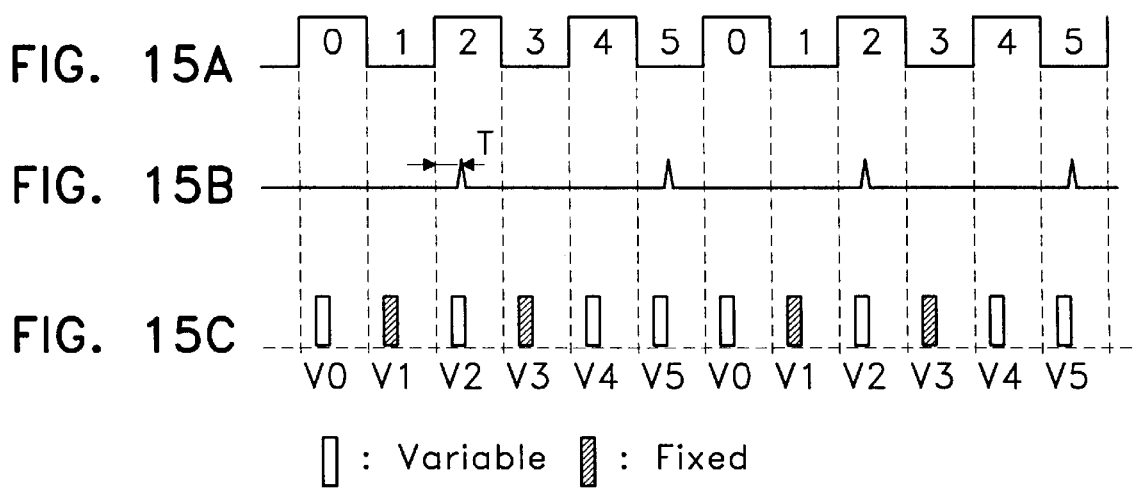

METHOD OF LOW-SPEED REPRODUCING IN A VIDEO CASSETTE RECORDER

BACKGROUND OF THE INVENTION

1. Field of the Invention

The present invention relates to a method for low-speed reproducing in a video cassette recorder (VCR). More particularly, it relates to a method for low-speed reproducing in a video cassette recorder (VCR) capable of reproducing a continuous time varying image in which a noise, or an unstable vibration of the screen is prevented when reproducing at a low speed of ⅔, ½, etc. of the normal speed in the VCR.

2. Description of the Related Art

Generally, a video cassette recorder (VCR) is an apparatus for recording and reproducing a video and an audio signal recorded on a recording medium, i.e., a video cassette tape. The VCR can reproduce the recorded video signal at a normal, low or high speed, or can stop reproducing the signal.

The servo system of the VCR is divided into a drum servo which controls the rotation of a head, and a capstan servo which controls the track and maintains the running speed of the recording medium. Specifically, the capstan servo controls the phase and speed of the capstan motor so that the head which is allotted to each channel can accurately reproduce the video signal of the relevant channel. The capstan servo also regularly maintains the running speed of the recording medium when reproducing or recording. The rotation speed of the capstan motor is controlled by obtaining a capstan speed error voltage from a capstan frequency generator (CFG) signal corresponding to the running speed of the recording medium. In the case of a low-speed reproducing, a temporary stop, a classifying operation, etc., a slow step signal outputted from the microcomputer is applied to the capstan motor.

The phase of the capstan motor is controlled by adding the capstan speed control voltage to a capstan phase error voltage which is obtained by comparing the frequency of a control signal with a reference frequency when reproducing.

In the case of a conventional 2-head VCR, a first head (channel 1) and a second head (channel 2) are arrayed at the periphery of the head drum facing each other apart by 180 degrees. Moreover, in order to enhance the recording density in the conventional recording medium, a method for obliquely recording the video signal in the recording medium per unit of field is applied. Here, the video signal is recorded in alternating turns in a first field (field 1) corresponding to channel 1 and in a second field (field 2) corresponding to channel 2. The signals recorded in field 1 and field 2 are recorded using an Azimuth recording method in order to prevent the signals from disturbing each other.

When the recording medium is run at a predetermined speed by the capstan motor and the head drum is rotated at a predetermined speed by a spindle motor, the first head reproduces the video signal recorded in field 1 (channel 1) and the second head reproduces the video signal recorded in field 2 (channel 2) according to the head switching pulse signal. By composing the signals recorded in fields 1 and 2, it is possible to reproduce the video signal of one frame.

In addition, in the conventional low-speed reproducing method, a stopped (paused) screen is continuously reproduced irregularly by simply rotating the capstan motor with the slow step method. In this case, the reproduced screen is stopped once per a predetermined period.

SUMMARY OF THE INVENTION

Therefore, it is an object of the present invention to provide a method for low-speed reproducing in a video cassette recorder (VCR) capable of reproducing a continuous time varying image of high quality and without noise by generating a pseudo head switching pulse signal for determining a switching period of a main head and an additional head.

It is another object of the present invention to provide a method for low-speed reproducing in a video cassette recorder capable of reproducing a time varying image which is always stable by controlling the generation of a control pulse which controls the tracing position of a head when performing low-speed reproducing in the VCR.

Yet another object of the present invention is to provide a method of low-speed reproducing in a video cassette recorder capable of preventing unstable vibration of the reproduced image on the screen which is caused when a vertical synchronization is not detected on the section of the recording medium when reproducing signals in the VCR at a low speed, or when the vertical synchronization signal is detected from different positions.

According to one aspect of the present invention, a period which is regularly and repeatedly performed is detected from an envelope waveform of a video signal generated by the main head. The pseudo head switching pulse signal for switching the operation state of the main head and the additional head is generated according to the detected period, and the voltage level of the envelope waveform detected by the main head is compared with the voltage level of the envelope waveform detected by the additional head. According to the compared result, a reproducing signal is detected from one head which has the envelope waveform having a high voltage level.

Here, the period indicates the number of the head switching pulse corresponding to the least common multiple of the speed to be reproduced.

According to another aspect of the present invention, the period which is regularly and repeatedly performed is detected from the envelope waveform of the video signal which is reproduced by the main head. The pseudo head switching pulse signal for switching the operation state of the main head and the additional head is generated according to the detected period, and a control signal is moved to a section where the level of the envelope waveform is high in the positive and negative sections of the pseudo head switching signal, thereby searching for a position where the varying amount of the envelope waveform arrives at its maximum. It is possible to automatically control the tracking within the section of the head switching pulse signal corresponding to the searched position.

According to another aspect of the present invention, the period which is regularly and repeatedly performed is detected from the envelope waveform of the video signal which is reproduced by the main head. The pseudo vertical synchronization signal corresponding to the head switching pulse signal is generated at a position which is delayed by a predetermined period from each edge part of the head switching pulse signal. The position of the pseudo vertical synchronization signal is variably set in the section where the additional heads are operated. In addition, the position of the pseudo vertical synchronization signal is variably and fixedly set in alternating turns in the section where the main heads are operated.

Here, initial positions of each pseudo vertical synchronization signal are set to 6.5H, 6.75H, 6H, 5H, 5.25H and 6.75H, when reproducing at a low speed of ⅔ of normal speed.

The pseudo vertical synchronization signal can vary the position within a range of 5H to 8H.

The pseudo vertical synchronization signal is set so that its position can be varied based on the 0.25H.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein;

FIGS. 6A to 6F are waveforms formed when reproducing at a low speed of ⅔ normal speed, wherein:

FIG. 6A is a waveform of the head switching pulse signal;

FIG. 6B is a waveform of the control signal;

FIG. 6C is an envelope waveform of the video signal reproduced by an SP head;

FIG. 6D is an envelope waveform of the video signal reproduced by an SLP head;

FIG. 6E is a waveform of a pseudo head switching pulse signal for selecting the SP head and the SLP head; and FIG. 6F is a waveform of the envelope which is composed by the pseudo head switching pulse signal of FIG. 6E;

FIGS. 8A to 8F are waveforms formed when reproducing at a low speed of ½ normal speed, wherein:

FIG. 8A is a waveform of a head switching pulse signal;

FIG. 8B is a waveform of a control signal;

FIG. 8C is an envelope waveform of the video signal reproduced by an SP head;

FIG. 8D is an envelope waveform of the video signal reproduced by an SLP head;

FIG. 8E is a waveform of a pseudo head switching pulse signal for selecting the SP head and the SLP head; and FIG. 8F is an envelope waveform which is composed by the pseudo head switching pulse signal of FIG. 8E;

FIGS. 11A to 11H are waveforms formed when reproducing at a low speed of ⅔ normal speed, wherein:

FIG. 11A is a waveform of a head switching pulse signal;

FIG. 11B is a waveform of a control signal;

FIG. 11C is a view illustrating a tracking control range according to the head switching pulse signal;

FIG. 11D is an envelope waveform of the video signal reproduced by an SP head;

FIG. 11E is an envelope waveform of the video signal reproduced by an SLP head;

FIG. 11F is a waveform of a pseudo head switching pulse signal for selecting the SP head and the SLP head;

FIG. 11G is a view illustrating the tracking control range by the pseudo head switching pulse signal; and FIG. 11H is an envelope waveform composed by the pseudo head switching pulse signal;

FIGS. 12A to 12H are waveforms formed when reproducing at a low speed of ½ normal speed, wherein:

FIG. 12A is a waveform of the head switching pulse signal;

FIG. 12B is a waveform of the control signal;

FIG. 12C is a view illustrating the tracking control range by the head switching pulse signal;

FIG. 12D is an envelope waveform the video signal reproduced by an SP head;

FIG. 12E is an envelope waveform of the video signal reproduced by an SLP head;

FIG. 12F is a waveform of a pseudo head switching pulse signal for selecting the SP head and the SLP head;

FIG. 12G is a view illustrating the tracking control range by the pseudo head switching pulse signal; and FIG. 12H is a waveform composed by the pseudo head switching pulse signal;

FIGS. 13A and 13B are views illustrating the relation between the head switching pulse signal and the vertical synchronization signal, respectively, when reproducing at normal speed;

FIGS. 14A, 14B and 14C are graphic representations illustrating the relationship between the head switching pulse signal, the control signal and the vertical synchronization signal, respectively, when reproducing at a low speed of ⅔ normal speed; and FIGS. 15A, 15B and 15C are graphic representations illustrating the relationship between the head switching pulse signal, the control signal and the vertical synchronization signal, respectively, when reproducing at a low speed of ⅔ normal speed.

DETAILED DESCRIPTION OF PREFERRED EMBODIMENTS

The objects, characteristics and advantages of the above-described invention will be more clearly understood through the preferred embodiments referring to the attached drawings.

Figure 1:
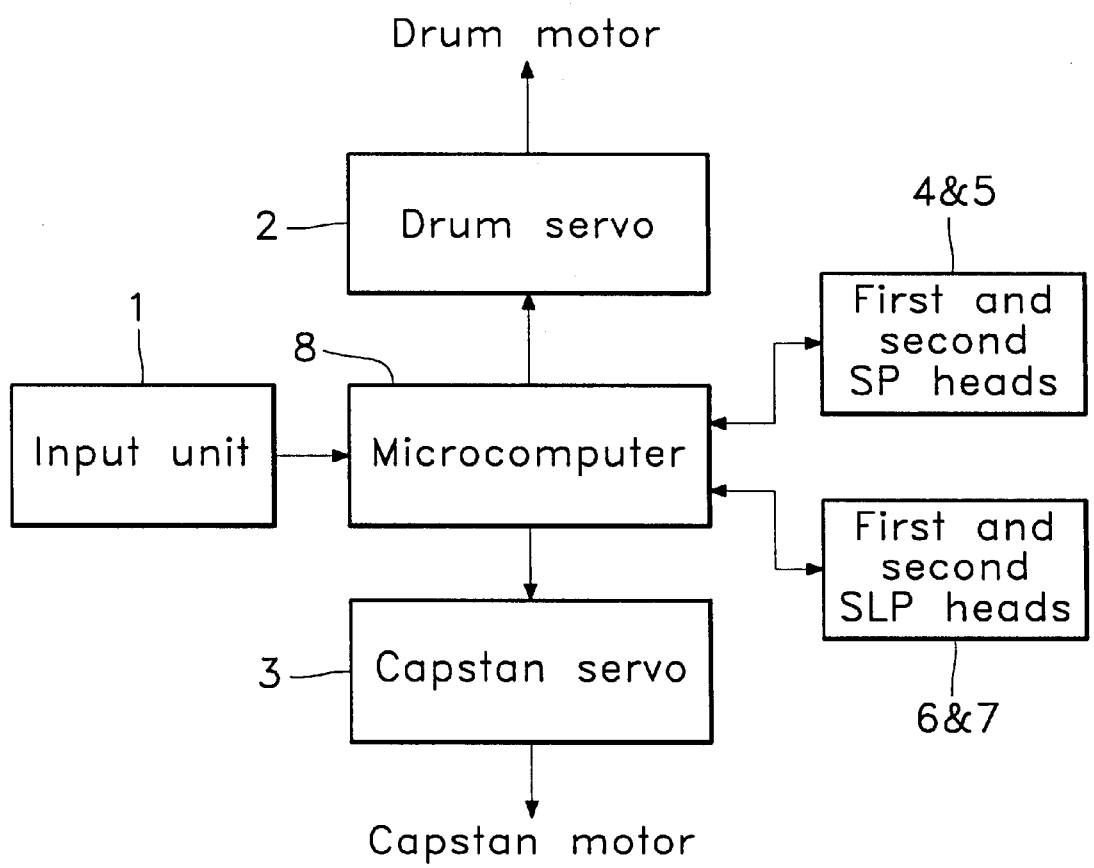
FIG. 1 is a basic block diagram illustrating a VCR for performing a method of low-speed reproducing according to the present invention.

FIG. 1 is a block diagram showing a VCR employed in the present invention. An input unit 1 has a plurality of keys for selecting either normal-speed reproducing or variable speed reproducing. A drum servo 2 controls the rotation state of a drum motor so that the rotating speed of a head can be maintained at a prescribed speed.

A capstan servo 3 controls the phase and speed of the capstan motor so that a head allotted to a channel can accurately reproduce a video signal therefrom. The capstan servo 3 also constantly maintains the running speed of the recording medium when reproducing or recording the signal. The capstan speed control can be achieved by obtaining a capstan speed error voltage from a capstan frequency generator (CFG) signal corresponding to the running speed of the recording medium and then controlling the rotation of the capstan motor. In the specific cases of a low-speed reproducing, a temporary stop and a classifying operation, a slow step control signal outputted from microcomputer 8 is supplied to capstan servo 3. A capstan phase control can be performed by obtaining a capstan phase error voltage through comparing a frequency of the control signal with a reference frequency when reproducing the signal and then adding the obtained voltage to a capstan speed control voltage, thereby controlling the speed of the capstan motor.

First and second standard play (SP) beads 4 and 5, which are also referred to as the main heads, detect the video signal recorded in the field of the recording medium when reproducing at normal-speed.

First and second super long play (SLP) heads 6 and 7 which are also referred to as the additional heads, are utilized soley for variable-speed reproducing.

The microcomputer 8 controls drum servo 2 and capstan servo 3 after receiving the input signal selected by input unit 1, and outputs the head switching pulse signal of first and second SP heads 4 and 5 and first and second SLP heads 6 and 7. Moreover, after determining the regularity of an envelope waveform of the video signal reproduced by first and second SP heads 4 and 5, microcomputer 8 outputs a pseudo head switching pulse signal.

Figure 2:
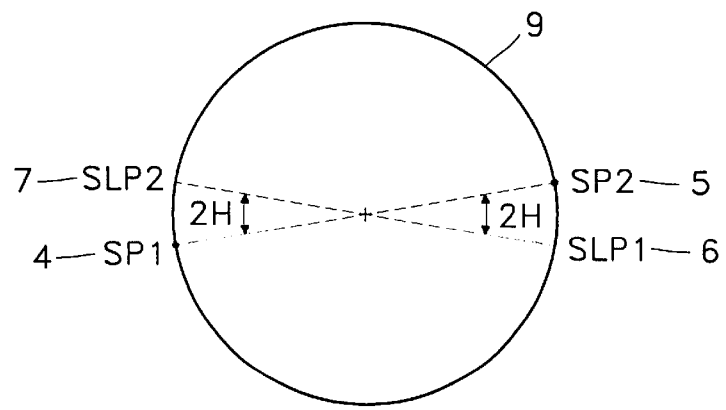
FIG. 2 is a schematic diagram illustrating the layout of a head in a head drum mounted on a 4-head VCR.

FIG. 2 is a schematic view illustrating the layout of a head in a head drum mounted in a 4-head VCR. As shown in the drawing, first SP head 4 and second SP head 5 are positioned at the periphery of head drum 9, and disposed 180 degrees from each other. In addition, the second SLP head 7 and first SLP head 6 are located with respect to each other as much as 180 degrees apart at positions which are separated from first SP head 4 and second SP head, respectively.

Figure 3:
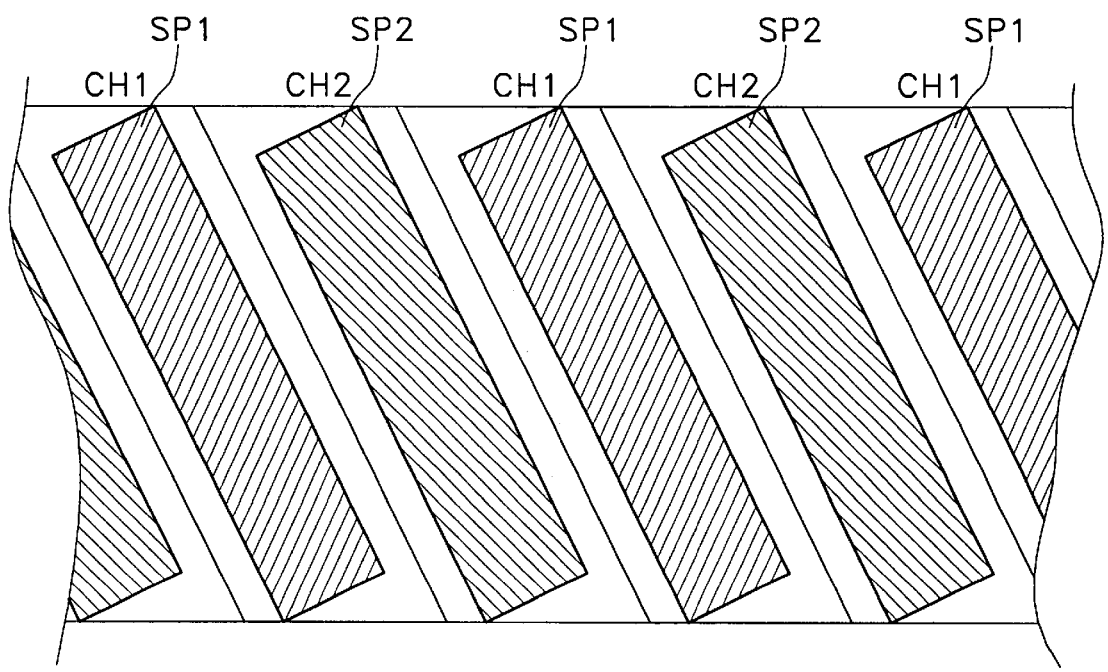
FIG. 3 is a schematic representation of the tracing relation between a field of a video signal recorded on a recording medium and a head when reproducing at normal speed.
Figure 4:
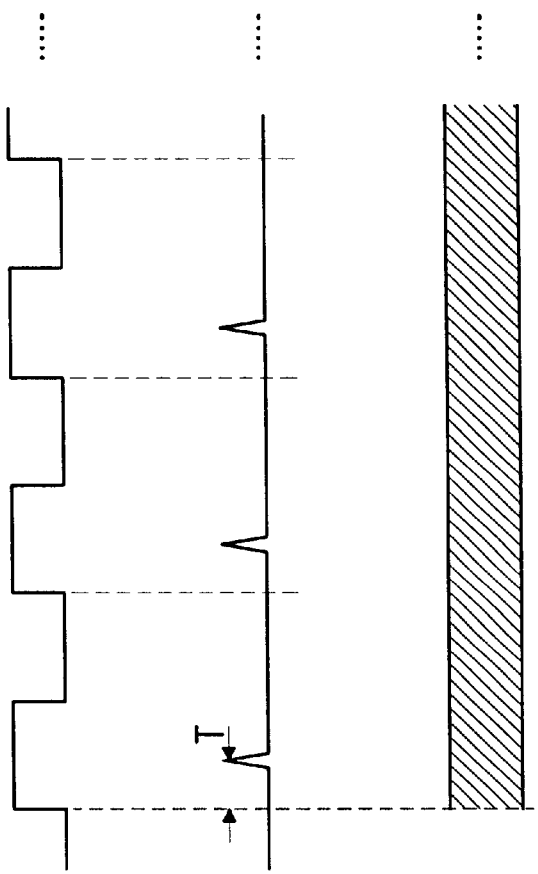
FIGS. 4A, 4B and 4C are graphic representations of the relationship between a head switching pulse signal, a control signal and an envelope waveform, respectively, when reproducing at a normal speed as shown in FIG. 3.

The relation between each head concerned when the video signal recorded on the recording medium is reproduced at a normal speed will be explained with reference to FIGS. 3 and 4.

As described above, a method for obliquely recording the video signal in the recording medium per unit of field is adopted in order to enhance the recording density of the recording medium. Here, the video signal is recorded in alternating turns in a field 1 corresponding to a channel 1 and a field 2 corresponding to a channel 2. The video signal is recorded in field 1 and field 2 via an Azimuth method in order to prevent the signals from disturbing each other.

When the recording medium is run at a predetermined speed and head drum 9 is rotated by a spindle motor at a predetermined speed, first SP head 4 reproduces the video signal recorded in field 1, i.e., channel 1, and second SP head 5 reproduces the video signal recorded in field 2, i.e., channel 2, according to the head switching signal generated from microcomputer 8. Here, microcomputer 8 finally outputs the video signal of one frame by composing the video signal reproduced by first SP head 4 and the video signal reproduced by second SP head 5.

At this time, in the case of normal-speed reproducing, the video signals recorded in field 1 and field 2 are reproduced by SP heads 4 and 5, respectively, according to the head switching pulse signal shown in FIG. 4A and the control signal shown in FIG. 4B. As a result, the envelope waveform of the reproduced video signals per each field is stable and has a constant level.

Figure 5:
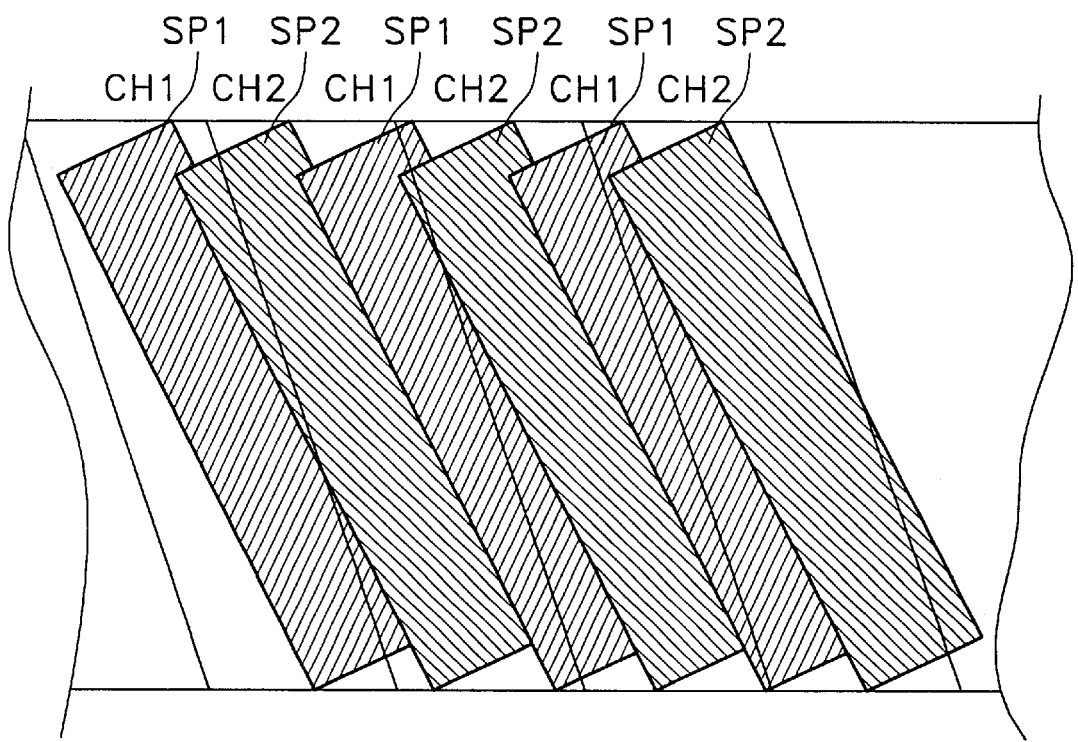
FIG. 5 is a schematic representation of the tracing relation between a field of a video signal recorded on a recording medium and a head when reproducing at a low speed of ⅔ normal speed.
Figure 6:
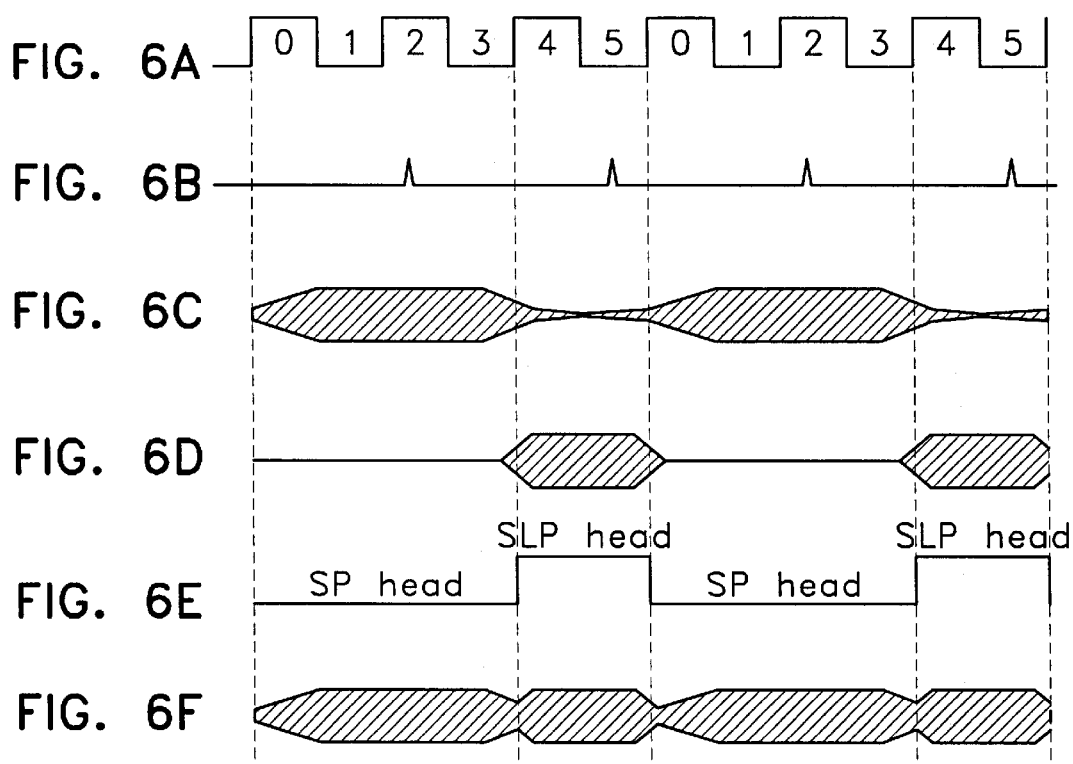

On the contrary, in the case of the VCR reproducing at a low speed of $2/3$ normal speed, the capstan motor is rotated at the low speed of $2/3$ normal speed as shown in FIG. 5, while the drum motor is rotated at normal speed. Accordingly, the recording medium is transported at the low speed of $2/3$ normal speed, and first and second SP heads 4 and 5 reproduce the recorded signal by tracing the relevant field of the recording medium in alternating turns according to the head switching signal (See FIG. 6A.). At this time, the capstan frequency signal is delayed by $2/3$ normal speed, and then the control signal is delayed by $2/3$ normal speed as shown in FIG. 6B. This means that first and second SP heads 4 and 5 trace the track of the recording medium at a position which is delayed by $2/3$ normal speed. Here, the control signals are detected at positions where a predetermined time elapses from a positive edge part or a negative edge part of the head switching signal. These relate to a tracing position of the head capable of reproducing the video signal recorded in the relevant track at the optimum state.

In the case of low-speed reproducing, as one head traces both the relevant track and its neighboring track simultaneously, as shown in FIG. 6C, the envelope waveform of first and second SP heads 4 and 5 have a regularly repeating period of six (6) head switching pulses (which is the least common multiple of the relevant speed, i.e., $2/3$), and it is repeatedly detected. At this time, in sections where four head switching pulses are generated, the envelope waveform above the reference value is detected, from which a reproduced screen capable of being watched and having little noise is formed. In sections where the remaining two head switching pulses are generated, an envelope waveform below the reference value is detected, from which a reproduced screen incapable of being watched and having lots of noise is formed.

However, in the case of using first and second SLP heads 6 and 7 neighboring second and first SP heads 5 and 4, as shown in FIG. 6D, an envelope waveform which is contrary to the envelope waveform by the first and second SP heads 4 and 5 is formed.

Accordingly, microcomputer 8 outputs a pseudo head switching pulse signal so that an envelope waveform above the reference value can be selectively detected (See FIG. 6E). As a result, the envelope waveform of first and second SP heads 4 and 5 and the envelope waveform of first and second SLP heads 6 and 7 are combined and composed so that a continuous time varying image in which noise is excluded can be reproduced (FIG. 6F).

Figure 7:
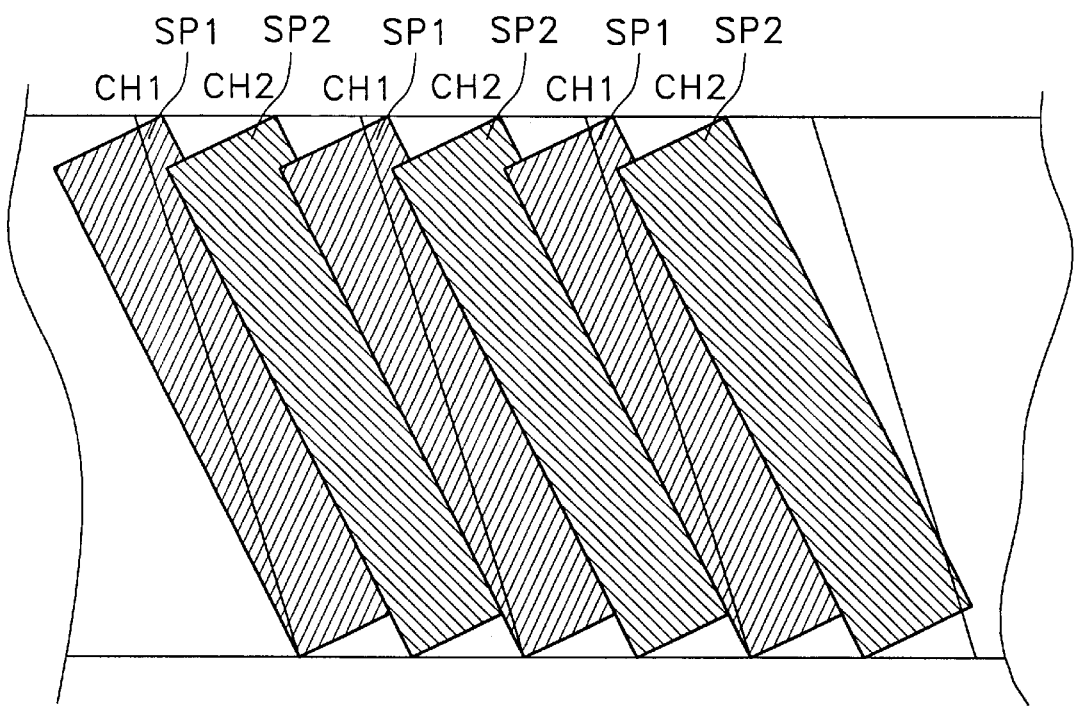
FIG. 7 is a schematic representation of the tracing relation between a field of the video signal recorded on the recording medium and the head when reproducing at a low speed of ½ normal speed.
Figure 8:
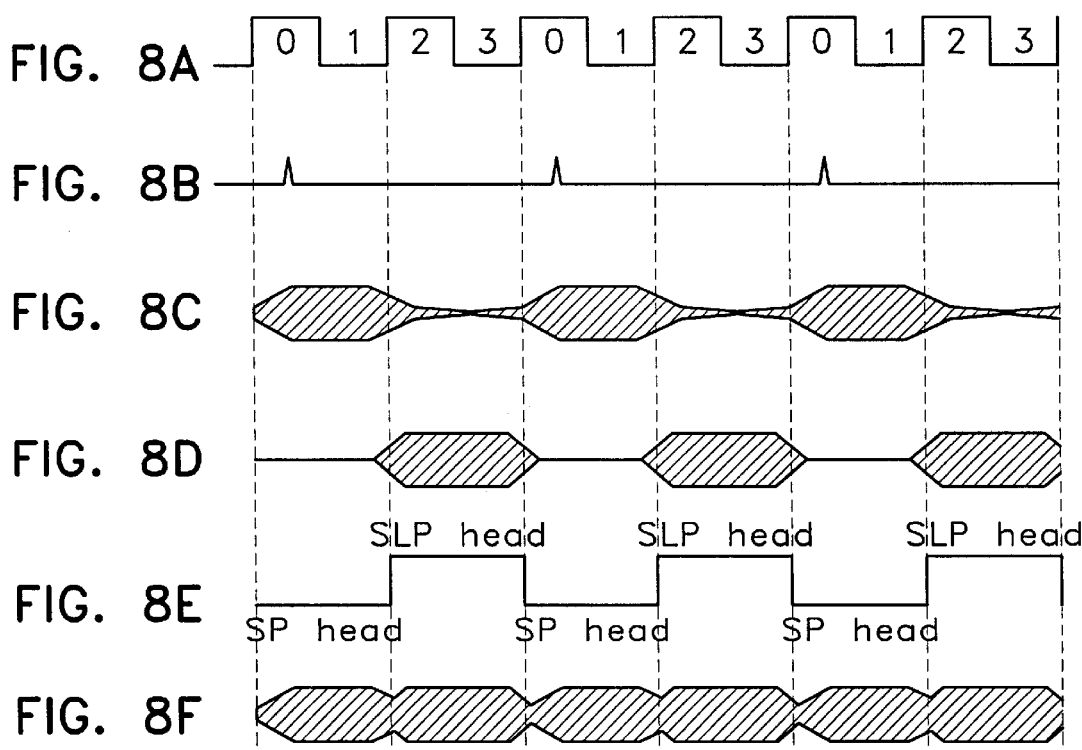

The case of reproducing the video signal at a low speed of ½ the normal speed will be explained, with reference to FIGS. 7 and 8. In such a case, the capstan motor is rotated at the low speed of ½ normal speed, while the drum motor is rotated at the normal speed. Accordingly, the recording medium is transported at the low speed of ½ normal-speed. The first and second SP heads 4 and 5 trace the relevant field of the recording medium in alternating turns (as shown in FIG. 7) according to the head switching signal shown in FIG. 8A in order to reproduce the recorded signal. At this time, the capstan frequency signal is detected as being delayed by ½ normal speed. As a result, the control signal, as shown in FIG. 8B, is delayed by ½ normal speed. This means that first and second SP heads 4 and 5 trace the track of the recording medium at a position which is delayed by ½ normal speed.

In the case of low-speed reproducing, since one head traces the relevant track and its neighboring track simultaneously, the envelope waveform of first and second SP head 4 and 5, as shown in FIG. 8C, has a regularly repeating period of four (4) head switching pulses (which is the least common multiple of the relevant speed, i.e., ½), and it is repeatedly detected. At this time, in sections where two head switching pulses are generated, the envelope waveform above the reference value is detected from which a reproduced screen capable of being watched and having little noise is formed. In sections where the remaining two head switching pulses are generated, an envelope waveform below the reference value is detected from which a reproduced screen incapable of being watched and having lots of noise is formed.

However, in the case of using first and second SLP heads 6 and 7 neighboring second and first SP heads 5 and 4, an envelope waveform which is contrary to the envelope waveform formed by first and second SP heads 4 and 5 is formed (FIG. 8D).

Accordingly, microcomputer 8 outputs the pseudo head switching pulse signal shown in FIG. 8E so that an envelope waveform above the reference value can be selectively detected. As a result, the envelope waveform of first and second SP heads 4 and 5 and the envelope waveform of first and second SLP heads 6 and 7 are composed so that a continuous time varying image in which noise is excluded can be reproduced (FIG. 8F).

The relevant regularly repeating period is detected by detecting the envelope formed by first and second SP heads 4 and 5. Subsequently, the pseudo head switching pulse signal, capable of switching first and second SP heads 4 and 5 and first and second SLP heads 6 and 7, is generated based on the detected period. As a result, the sections of the envelope waveform of first and second SP heads 4 and 5 having the voltage level below the reference value are substituted with the sections of first and second SLP heads 6 and 7 in order to suppress noise and detecting the continuous time varying image.

As described above, the method for low-speed reproducing according to the present invention is not limited to reproducing at a low speed of ⅔ or ½ normal speed. It is widely applicable to all speeds lower than normal speed.

The method of automatically controlling the tracking in order to reproduce an optimum screen at the low-speed will be explained hereinbelow.

Figure 9:
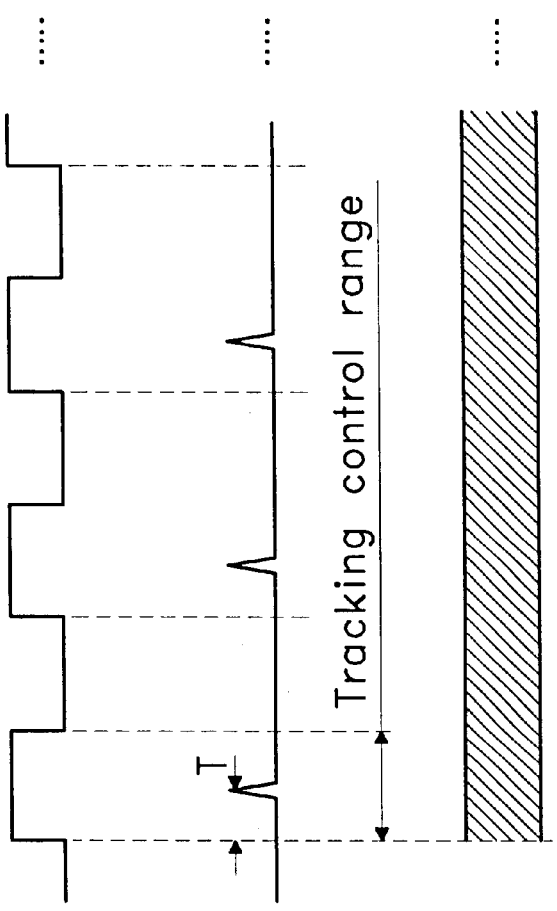
FIGS. 9A, 9B and 9C are graphic representations of the relationship between a head switching pulse signal, a control signal with a control range and an envelope waveform, respectively, when reproducing at a normal speed.
Figure 10:
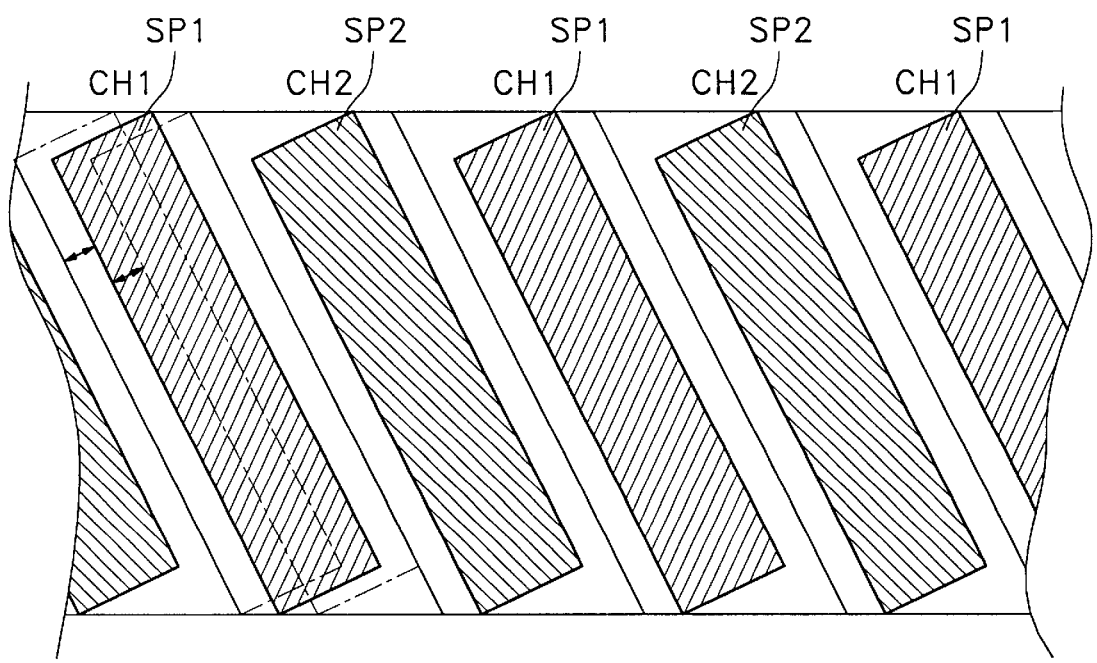
FIG. 10 is a schematic representation of the tracing relation of the head according to the tracking control state shown in FIGS. 9A–9C.

First, the method of automatically controlling the tracking when reproducing at normal speed is explained. When the video signal recorded on the recording medium is reproduced at the normal-speed, the control signal shown in FIG. 9B is generated at positions where a predetermined time T1 elapses from the positive/negative edge generating parts of the head switching pulse signal shown in FIG. 9A. At this time, when the position where the control signal is generated is controlled minutely, the tracing position of the head is varied in the relevant field, as shown in FIG. 10. Accordingly, microcomputer 8 moves the position of the control signal to the right and left by the predetermined initial time T1, and detects an optimum envelope waveform by varying the point where the video signal is reproduced by the head. At this time, the variable range of the control signal is within the ½ period of the head switching pulse signal, i.e., the period corresponding to one pulse of a logic high or a logic low.

Now the method of automatically controlling the tracking in the case of reproducing at a low speed of ⅔ normal speed will be explained. In such case, the control signal shown in FIG. 11B which is delayed by ⅔ normal speed is detected, and the capstan motor is synchronized with the control signal and is then rotated, thereby running the recording medium. In other words, as shown in FIG. 11A, the head switching signal has a regularity per period of six (6) head switching pulses which is the least common multiple of the relevant speed, i.e., ⅔, and it is repeatedly detected. At this time, sections where four head switching pulses are generated, the envelope waveform over the reference value is detected (FIG. 11D). In sections where the remaining two head switching pulses are generated, the envelope waveform below the reference value is detected.

However, when using first and second SLP heads 6 and 7 neighboring second and first SP heads 5 and 4, respectively, the envelope waveform detected by first and second SLP heads 6 and 7 has a voltage level which is contrary to the envelope waveform formed by above-mentioned first and second SP heads 4 and 5.

Accordingly, microcomputer 8 outputs a pseudo head switching pulse signal (FIG. 11F) for selectively selecting the envelope waveform over the reference value. Accordingly, as shown in FIG. 11H, an envelope waveform composed of the envelope waveforms of first and second SP heads 4 and 5 and first and second SLP heads 6 and 7, respectively, is detected.

Here, the envelope waveform shown in FIG. 11H has the largest level in the third section indicated as '2' and the sixth section indicated as '5' in the sections of the head switching pulse signal. However, as shown in FIG. 11C, since the position where the control signal is initially generated is located within the first section of the head switching pulse signal indicated as '0', while a control pulse is not generated until the third section of the head switching pulse signal indicated as '2', the tracking control range is limited to the third section of the head switching pulse signal, making optimum tracking impossible to perform.

On the contrary, when the tracking control range is within the first section of the pseudo head switching pulse signal, which is indicated as SP head (FIGS. 11F and 11G), it is extended to the fourth section from the first section of the head switching pulse signal. Thus enabling microcomputer 8 to perform the optimum tracking control within the first section of the pseudo head switching pulse signal. Accordingly, it is possible to obtain the optimum screen which is reproduced from the video signal recorded on the recording medium.

Now, the method for automatically controlling the tracking in the case of reproducing at a low speed of ½ normal speed will be explained. In such a case, the control signal shown in FIG. 12B is delayed by ½ of normal speed, and the capstan motor is synchronized with the control signal and then is rotated, thereby running the recording medium. In other words, as shown in FIG. 12A, the head switching pulse signal has a regularity per period of four (4) head switching pulses which is the least common multiple of the relevant speed, i.e., ½, and it is repeatedly generated. At this time, as shown in FIG. 12D, in sections where two head switching pulses are generated, the envelope waveform over the reference value is detected. In sections where the remaining two head switching pulses are generated, the envelope waveform below the reference value is generated.

However, in the case of using first and second SLP heads 6 and 7 neighboring second and first SP heads 5 and 4, respectively, the envelope waveform detected by first and second SLP heads 6 and 7 has a voltage level which is contrary to the envelope waveform formed by above-mentioned first and second SP heads 4 and 5, as shown in FIG. 12E.

Microcomputer 8 outputs a pseudo head switching pulse signal shown in FIG. 12F for selectively selecting the envelope waveform over the reference value. Accordingly, as shown in FIG. 12H, an envelope waveform composed of the envelope waveforms of first and second SP heads 4 and 5 and first and second SLP heads 6 and 7, respectively, is detected.

Here, the composed envelope waveform (FIG. 12H) has the largest level in the first section indicated as '0' and the fourth section indicated as '3' of the head switching pulse signal. However, as shown in FIG. 12C, since the position where the control signal is initially generated is located within the first section indicated as '0' of the head switching pulse signal and a control pulse is generated during the first section, the tracking control range is limited to the first section of the head switching pulse signal, making optimum tracking impossible to perform.

On the contrary, in the case that the tracking control range is within the first section of the pseudo head switching pulse signal which is indicated as SP head, as shown in FIG. 12G, since the tracking control range is extended to the second section from the first section of the head switching pulse signal, microcomputer 8 can perform the optimum tracking within the first section of the pseudo head switching pulse signal. Accordingly, it is possible to obtain the optimum screen which is reproduced from the video signal recorded in the recording medium.

Moreover, a method of for suppressing unstable vibration of the frame to obtain the optimum reproduced frame in the case of low speed reproducing will be illustrated hereinbelow.

First, the detection of the vertical synchronization signal in the case of normal-speed reproducing is explained. In the case of reproducing the video signal recorded on the recording medium at the normal speed, the vertical synchronization signal shown in FIG. 13B is detected at a position where a predetermined time T2 elapses from the positive/negative edge generating parts of the head switching pulse signal shown in FIG. 13A. The vertical synchronization signal is used for determining the starting position where the reproduced video signal of one frame is displayed on the display device, e.g., a monitor. In other words, as one frame is composed of a pair of fields, a pair of vertical synchronization signals for forming one frame is recorded in the pair of fields. The vertical synchronization signal is detected by first and second SP heads 4 and 5 in the case of normal-speed reproducing, and the reproduced screen detected by the vertical synchronization signal is synchronized with a display starting position, i.e., an initial position where the screen is formed, of the display device and then is displayed. As a result, when reproducing at normal speed, the detected vertical synchronization signal corresponds to each edge part of the head switching pulse signal (i.e., for every edge part, a vertical synchronization signal is detected).

Now, the method for suppressing the unstable vibration of the screen in the case of reproducing at a low speed of $\tfrac{2}{3}$ normal speed will be illustrated as follows.

When the video signal recorded on the recording medium is reproduced at a low speed of $\tfrac{2}{3}$ normal speed, only two (2) control signals are detected within the three periods of the head switching pulse signal (FIGS. 14A and 14B). As a result, four (4) vertical synchronization signals are detected during the switching pulse of the three periods, i.e., six sections ('0'–'5'), as shown in FIG. 14C. Moreover, as shown in FIG. 2, since the locations of first and second SP heads 4 and 5 are different from the locations of first and second SLP heads 6 and 7, a positional error of the vertical synchronization signal occurs. In other words, T1 is not equal to T2.

Accordingly, as shown in FIG. 15C, microcomputer 8 generates a pseudo vertical synchronization signal having an optional delayed time per each section of the head switching pulse signal. After that, in the pseudo vertical synchronization signal V0–V3 within the sections where first and second SP heads 4 and 5 are operated, the variable and fixed vertical synchronization signals alternate in location. In the pseudo vertical synchronization signal V4 to V5 within the sections where SLP heads 6 and 7 are operated, the location of the pseudo vertical synchronization signal is variably set.

For example, as shown in FIG. 15C, the positions of a second pseudo vertical synchronization signal V1 and a fourth pseudo vertical synchronization signal V3 are fixed, and the location of the remaining pseudo vertical synchronization signals V0, V2, V4 and V5 are variably set.

Here, as a tested result from the method for suppressing the unstable vibration of the screen in the case of variable-speed reproducing, the positions of each pseudo vertical synchronization signal are preferably set to V0 (6.5H), V1(6.75H), V2(6H), V3(5H), V4(5.25H) and V5(6.75H). Here, 'H' indicates a horizontal scanning time of one line. In the case of varying the pseudo vertical synchronization signal, the variation range is preferably set as 0.25H. More preferably, in the case of varying the pseudo vertical synchronization signal, as one from the pseudo vertical synchronization signals capable of being varied is varied, the remaining variable pseudo vertical synchronization signals are simultaneously changed.

As a result, since the vertical synchronization signal is located within the range from 5H to 8H, the aforesaid condition of the present invention coincides with the condition of the position of the vertical synchronization signal in a conventional VCR. Accordingly, in the case of reproducing at a low speed of $\tfrac{2}{3}$, etc. of normal speed, since it is possible to vary the position of the vertical synchronization signal, the unstable vibration of the screen is prevented.

As described above, the present invention is not limited to a method for reproducing at a low speed of $\tfrac{2}{3}$ normal speed. It is widely applicable to all speeds lower than normal-speed. Moreover, it has no problem when the fixed and variable positions of the pseudo vertical synchronization signals which are set in the present invention are reciprocally formed.

Accordingly, the method for low-speed reproducing in a VCR according to the present invention has the following benefits.

First, noise can be suppressed and the continuous time varying image can be detected. This is accomplished by first detecting the relevant regularly repeating period by detecting the envelope waveform of the first and second SP heads. Then, the pseudo head switching signal, capable of switching the first and second SP heads and the first and second SLP heads based on the detected period, is generated. As a result, the reproduced signal from the first and second SP heads having a voltage level lower than the reference value is substituted with the reproduced signal of the first and second SLP heads.

Second, the optimum reproduced screen can be obtained by detecting the relevant regularly repeating period by detecting the envelope waveform of the first and second SP heads. Then, the pseudo head switching signal is generated based on the detected period. Next, the control signal is moved within the positive and negative sections of the pseudo head switching signal in order to find the position where the varying amount of the envelope waveform reaches its maximum. Finally, the tracking within the section of the head switching pulse signal corresponding to the searched position is automatically controlled.

Third, vibration of the screen resulting from low speed reproducing can be suppressed by generating the pseudo vertical synchronization signal corresponding to the head switching pulse signal so that the vertical synchronization signal can be detected within the sections of the head switching pulse signal corresponding to sections where the control pulse is not detected when reproducing at low-speed.

Finally, since the position of the vertical synchronization signal detected by the SP heads and the position of the vertical synchronization signal detected by the SLP heads are different from each other, unstable vibration of the screen is maximally prevented by varying the position of the pseudo vertical synchronization signal at the position where the SP heads are operated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for low-speed reproducing in a video cassette recorder (VCR) having a pair of main heads for normal-speed reproducing and at least two additional heads neighboring the main heads, comprising the steps of:

detecting a regularly repeated period from an envelope waveform of a video signal reproduced by the main heads wherein the period is a number of head switching pulses corresponding to a least common multiple of the speed to be reproduced;

comparing a voltage level of the envelope waveform detected by the main heads with a voltage level of an envelope waveform detected by the additional heads by generating a pseudo head switching pulse signal for switching the operation state of the main heads and the additional heads according to the detected period; and detecting a reproduced signal from one of the main and the additional heads which has the envelope waveform having the higher voltage level.

2. A method for low-speed reproducing in a video cassette recorder (VCR) having a pair of main heads for normal-speed reproducing and at least a pair of additional heads neighboring the main heads, comprising the steps of:

detecting a regularly repeated period from an envelope waveform of a video signal reproduced by the main heads;

generating a pseudo head switching signal for switching the main heads and the additional heads based on the detected period;

searching for a position where a varying amount of the envelope waveform is at a maximum by moving a control signal within positive and negative sections of the pseudo head switching signal; and automatically controlling tracking within a section of the pseudo head switching signal corresponding to the searched position.

3. The method of claim 2, wherein the period is a number of the head switching pulses corresponding to a least common multiple of the speed to be reproduced.

4. A method for low-speed reproducing in a video cassette recorder (VCR) having a pair of main heads for normal-speed reproducing and at least a pair of additional heads neighboring said main heads, comprising the steps of:

detecting a regularly repeated period from an envelope waveform of a video signal reproduced by the main heads;

generating pseudo vertical synchronization signals corresponding to a head switching pulse signal at a position where a predetermined time elapses from each edge part of the head switching pulse signal;

variably setting positions in sections of the pseudo vertical synchronization signals where the additional heads are operated; and variably and fixedly setting positions by alternating turns in sections of the pseudo vertical synchronization signal where the main heads are operated.

5. The method of claim 4, wherein the period is a number of the head switching pulses corresponding to the least common multiple of the speed to be reproduced.

6. The method of claim 4, wherein initial positions of the pseudo vertical synchronization signals being generated are delayed by 6.5H, 6.75H, 6H, 5H, 5.25H and 6.75H from each edge part of the head switching pulse, when reproducing at a low speed of ⅔ normal speed.

7. The method of claim 4, wherein the positions of the pseudo vertical synchronization signals vary being delayed in a range of 5H to 8H from each edge part of the head switching pulse signal.

8. The method of claim 4, wherein positions of the pseudo vertical synchronization signals vary 0.25H.

9. A method for low-speed reproducing in a video cassette recorder (VCR) having a pair of main heads for normal-speed reproducing and at least two additional heads neighboring the main heads, comprising the steps of:

utilizing the main heads to reproduce a recorded signal according to a head switching signal;

detecting a regularly repeated period of an envelope waveform of the main heads;

detecting the envelope waveform of the main heads above a predefined reference value;

detecting the envelope waveform of the main heads below the predefined reference value;

utilizing the additional heads to generate an envelope waveform complementary to the envelope waveform of the main heads;

outputting a pseudo head switching signal so that the envelope waveform above the reference value can be selectively detected;

composing the envelope waveform of the main heads and the envelope waveform of the additional heads to form a continuous time varying image;

searching for a position where the composed envelope waveform is at a maximum by moving a control signal within positive and negative sections of the pseudo head switching signal; and automatically controlling tracking within a section of the pseudo head switching pulse corresponding to the searched position.

10. The method of claim 9, wherein the period is the number of head switching pulses corresponding to a least common multiple of the speed to be reproduced.

11. The method of claim 9, wherein the envelope waveform above the reference value corresponds to a reproduced screen capable of being displayed and having little noise.

12. The method of claim 9, wherein the envelope waveform below the reference value corresponds to a reproduced screen incapable of being displayed and having noise.

* * * * *

UNITED STATES PATENT AND TRADEMARK OFFICE
CERTIFICATE OF CORRECTION

PATENT NO.     : 6,292,622 B1
DATED          : September 18, 2001
INVENTOR(S)    : Jong-gyu Lee and Gyu-yeong Son It is certified that error appears in the above-identified patent and that said Letters Patent is hereby corrected as shown below:

Title page,
Item [30] Foreign Application Priority Data,
"Feb. 6, 1997 (KR)....................................97-3882"

should be

-- Feb. 6, 1997 (KR).................................97-3682 --.

Signed and Sealed this

Twelfth Day of March, 2002

*Attest:*

*Attesting Officer*

JAMES E. ROGAN
*Director of the United States Patent and Trademark Office*